(12) United States Patent
Rupp et al.

(10) Patent No.: US 6,365,831 B1
(45) Date of Patent: Apr. 2, 2002

(54) ELECTRICAL BOX

(75) Inventors: Bradford D. Rupp, West Unity; Thomas D. Knecht, Edgerton, both of OH (US)

(73) Assignee: Allied Moulded Products, Inc., Bryan, OH (US)

( * ) Notice: Subject to any disclaimer, the term of this patent is extended or adjusted under 35 U.S.C. 154(b) by 0 days.

(21) Appl. No.: 09/481,031

(22) Filed: Jan. 11, 2000

(51) Int. Cl.[7] .................................................. H01J 5/00
(52) U.S. Cl. ........................ 174/50; 174/58; 220/4.02; 439/535; 298/906
(58) Field of Search ............................... 174/50, 53, 58, 174/60, 59, 61; 220/3.2, 3.8, 3.9, 4.02; 439/535; 248/906

(56) References Cited

U.S. PATENT DOCUMENTS

| | | |
|---|---|---|
| 4,306,109 A | 12/1981 | Nattel |
| 4,316,999 A | 2/1982 | Nattel |
| 4,436,952 A | 3/1984 | Lockwood |
| 4,499,332 A * | 2/1985 | Shea et al. ................. 174/48 |
| 4,724,282 A | 2/1988 | Troder |
| 5,336,849 A * | 8/1994 | Whitney ..................... 174/48 |
| 5,886,295 A * | 3/1999 | Carino et al. ............... 174/48 |
| 5,942,727 A * | 8/1999 | Strange ...................... 174/58 |
| 6,005,188 A * | 12/1999 | Teichler et al. ............. 174/50 |
| 6,127,627 A * | 10/2000 | Daoud ........................ 174/50 |

* cited by examiner

Primary Examiner—Anthony Dinkins
Assistant Examiner—Dhiru R Patel
(74) Attorney, Agent, or Firm—Krieg DeVault Lundy LLP

(57) ABSTRACT

An electrical outlet box of all shapes and sizes for use with one or more electrical cables having an enclosure with a peripheral wall and a bottom. The peripheral wall upstands from the bottom and has a plurality of cable openings therein. The cable openings each close by a door. The door is pivotally connected to the bottom for rotary motion from a closed position generally parallel to the wall about an axis generally parallel to the bottom to an open position within the enclosure. The door has a peripheral edge remote from its connection to the bottom which clamps a cable positioned in the box between the wall and the door wall. The door is biased toward the wall and has door guides associated therewith to ensure the movement of the door about the axis and to prevent cable from being lodged between the door and the door guides out of engagement with the peripheral edge of the door. A specific embodiment of the new and improved electrical outlet box of the invention complies with 1999 Standard UL 514C including paragraphs 26 and 27 and the proposed 1999 amendments thereto in paragraph 27.4.

31 Claims, 2 Drawing Sheets

ELECTRICAL BOX

BACKGROUND OF THE INVENTION

This invention relates to electrical boxes, and more particularly to electrical boxes including clamping devices used for securing electrical cables to electrical boxes in accordance with the National Electrical Code, Section 370-17(c).

Various electrical boxes have been utilized to provide some means for securing an electrical cable to electrical boxes so as to prevent inadvertent disconnection or disengagement of the cable from the box. Various electrical codes and standards have been applied to these electrical boxes. These include the National Electrical Code, Section 370 and the Third Edition of the Standard For Nonmetallic Outlet Boxes, Flush-Device Boxes And Covers, UL 514C. Recently, new requirements have been suggested for nonmetallic outlet boxes by Underwriters Laboratories, Inc. These new requirements are concerned with clamping electrical cables to electrical boxes such that the cables cannot be unintentionally removed from the box. The following are representative of these requirements:

"26 Knockouts 26.1 A force of 10 pounds (44.5 N) shall be applied to a knockout or integral cable clamp for 1 minute by means of a minimum 1½ inch (38.1 mm) long by ¼ inch (6.4 mm) diameter mandrel with a flat end. The force is to be applied in a direction perpendicular to the plane of the knockout or clamp and at the point most likely to cause movement. The knockout or clamp shall remain in place and the clearance between the knockout or clamp and the opening shall not be more than 0.030 inch (0.75 mm) when measured 1 hour after the force has been removed.

26.2 A knockout shall be easily removed by means of a screw driver, used as a chisel, without leaving any sharp edges or causing any damage to the box. The side edge of a screwdriver may be run along the edge of the knockout opening once, to remove any fragile tabs remaining along the edge.

26.3 A box that is constructed of a material that is known to be affected by low temperatures is to be conditioned for 5 hours in air maintained at minus 20±1° C. (minus 4±2° F.). Immediately following this conditioning, the test described in 26.2 shall be repeated on the box.

26.4 For a box employing multi-stage knockouts, there shall be no displacement of a larger stage when a smaller stage is removed as described in 26.1 and 26.2."

"27.1 Pull Test 27.1.1 A box provided with a nonmetallic-sheathed-cable clamp shall be assembled in accordance with 27.1.2-

27.1.4 The clamp shall secure the cable so that it will withstand for 5 minutes the pull specified in 27.1.5 without:
  a) Damage to the cable sheath or the conductor insulation,
  b) Displacement of the cable more than ⅛ inch (3.2 mm),
  c) Loosening so that the cable is removable by bending or flexing after the pull force is removed, or
  d) Cracking, breaking, or other indication that the clamp has been damaged. *27.1 revised and relocated as 27.1.1 Sep. 30, 1998*

27.1.2 A box provided with a nonmetallic-sheathed cable clamp is to be assembled as intended to nonmetallic-sheathed cable that complies with the Standard for Nonmetallic-Sheathed Cables, UL 719. The cable or cables are to be of the size that the clamp is intended to secure. See 86.2.4 and 86.2.5. *27.2 relocated as 27.1.2 Sep. 30, 1998*

27.1.3 Knockout removal is to be in accordance with in 26.2. For an integral clamp, the holding tabs of the clamp, the holding tabs of the clamp, are to be cut. The integral clamp is not to be removed. After assembly, the cut end of the cable sheath is to be in contact with the stop when one is provided. When a stop is not provided, the cut end of the sheath is to extend ¼ inch (6.4 mm) beyond the clamp. The wires of the cable are to project 6 inches (152 mm) inside the box. A screw that has provision for tightening with a screwdriver is to be tightened as specified in 7.5. *27.3 revised and relocated as 27.1.3 Sep. 30, 1998*

27.1.4 The box is to secured so that the plane of the face of the box is vertical and the clamp being tested is located in the bottom surface. The free end of the cable is to be formed into a loop and securely fastened to itself by tape or equivalent means. The pull is to be applied to the loop by a hook or other convenient method. A clamp that is intended to secure more than one cable is to have the pull applied separately to each cable. *27.4 relocated as 27.1.4 Sep. 30, 1998*

27.1.5 A box with a nonmetallic-sheathed cable clamp is to be subjected to either:
  a) A direct pull of 60 lbs (267 N); or
  b) A direct pull of 25 lbs (110 N) and the tests specified in Aging and Dielectric Voltage-Withstand Test, Section 27.2, and Pull Test of 25 lbs (110 N), Section 27.3. *27.1.5 added Sep. 30, 1998*"

"27.3 Pull Test of 25 lbs (110 N)

27.3.1 With reference to 27.1.5(b), a clamp shall comply with 27.1.1 when tested as described in 27.32 and 27.3.3. *27.3.1 added Sep. 30, 1998*

27.3.2 Three sample boxes with clamps are to each be assembled to a nonmetallic-sheathed cable sample. Each clamp is then to be subjected to a direct pull of 25 lbs (110 N). *27.3.2 added Sep. 30, 1998*

27.3.3 Three sample assemblies consisting of a box with clamp and a nonmetallic-sheathed cable are to be conditioned for 24 hours in air at a temperature of minus 25±1° C. (minus 13±2° F.). Immediately after removal from the conditioning, the assembly is to be subjected to a direct pull of 25 lbs (110 N). *27.3.3 added Sep. 30, 1998*"

Certain other requirements have been proposed upon nonmetallic outlet boxes in 1999 to ensure that the outlet box will function as designed in relatively cold temperatures. Representative of these requirements are:

"27.4 Assembly At Low Temperature Test 27.4.1 When tested as described in 27.4.2, an integral cable clamp shall remain usable and stay in place during installation of nonmetallic-sheathed cable at low temperatures. *Added 27.4.1 effective May 1, 2000*

27.4.2 A box provided with an integral cable clamp for nonmetallic-sheathed cable is to be assembled in accordance with 27.1.2 and 27.1.3 after being conditioned in air maintained at minus 20±1° C. (minus 4±2° F.) for 5 hours. The sample is to be assembled in the conditioned air or within 15 seconds after removal. *Added 27.4.2 effective May 1, 2000*"

The methods heretofore used to secure the cable in accordance with the above requirements use clamps retained by screws to the box to grip the electrical cable inserted through openings in the box. These electrical boxes have the shortcoming that the installation is relatively cumbersome and the clamps require use of a screwdriver in the confines of an electrical box. Another variety of electrical box eliminates the use of a screwdriver and utilizes wedges which must be forced in place after the electrical cable is inserted into the confines of the box. See U.S. Pat. No. 4,724,282. Provisions must be made in distributing and selling the boxes for packaging the wedges such that they remain with the box and for providing for the separate generation of both boxes and wedges.

It is therefore highly desirable to provide a new and improved electrical outlet box. It is also highly desirable to provide a new and improved electrical outlet box which retains electrical cables in securance therewith without the use of screws. It is also highly desirable to provide a new and improved electrical outlet box which retains electrical cables in securance therewith without the use of clamps or wedges which have to be tightened or set. It is also highly desirable to provide a new and improved electrical outlet box by which electrical cables can be retained in securance therewith totally from the exterior of the box and without manipulation within the box. It is also highly desirable to provide a new and improved electrical outlet box which may be shipped without the fear of loss or special packaging or distribution of screws or wedges or clamps.

It is also highly desirable to provide a new and improved electrical outlet box which is easy to use and which presents little risk of damage to the electrical cable and the electrical outlet box. It is also highly desirable to provide a new and improved electrical outlet box which has all of these features when used at below freezing temperatures.

It is also highly desirable to provide a new and improved electrical outlet box which has knockouts and clamps which pass all requirements of 1999 UL Standard 514C. It is also highly desirable to provide a new and improved electrical outlet box which passes newly proposed 1999 UL Standard 514C Sections 27.4.1 and 27.4.2.

Finally, it is also highly desirable to provide a new and improved electrical outlet box having all of the above features.

SUMMARY OF THE INVENTION

It is an object of the invention to provide a new and improved electrical outlet box.

It is also an object of the invention to provide a new and improved electrical outlet box which retains electrical cables in securance therewith without the use of screws.

It is also an object of the invention to provide a new and improved electrical outlet box which retains electrical cables in securance therewith without the use of clamps or wedges which have to be tightened or set.

It is also an object of the invention to provide a new and improved electrical outlet box by which electrical cables can be retained in securance therewith totally from the exterior of the box and without manipulation within the box.

It is also an object of the invention to provide a new and improved electrical outlet box which may be shipped without the fear of loss or special packaging or distribution of screws or wedges or clamps.

It is also an object of the invention to provide a new and improved electrical outlet box which is easy to use and which presents little risk of damage to the electrical cable and the electrical outlet box.

It is also an object of the invention to provide a new and improved electrical outlet box which has all of these features when used at below freezing temperatures.

It is also an object of the invention to provide a new and improved electrical outlet box which has knockouts and clamps which pass all requirements of 1999 UL Standard 514C.

It is also an object of the invention to provide a new and improved electrical outlet box which passes newly proposed 1999 UL Standard 514C Sections 27.4.1 and 27.4.2.

Finally, it is an object of the invention to provide a new and improved electrical outlet box having all of the above features.

In the broader aspects of the invention, there is provided an electrical outlet box of all shapes and sizes for use with one or more electrical cables having an enclosure with a peripheral wall and a bottom. The peripheral wall upstands from the bottom and has a plurality of cable openings therein. The cable openings are each closed by a door. The door is pivotally connected to the bottom for rotary motion from a closed position generally parallel to the wall about an axis generally parallel to the bottom to an open position within the enclosure. The door has a peripheral edge remote from its connection to the bottom which clamps a cable positioned in the box between the wall and the door. The door is biased toward the wall and has door guides associated therewith to ensure the movement of the door about the axis and to prevent the cable from being lodged between the door and the door guides out of engagement with the peripheral edge of the door. A specific embodiment of the new and improved electrical outlet box of the invention complies with 1999 Standard UL 514C including paragraphs 26 and 27 and the proposed 1999 amendments thereto in paragraph 27.4.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein.

DESCRIPTION OF A SPECIFIC EMBODIMENT

Figure 3:
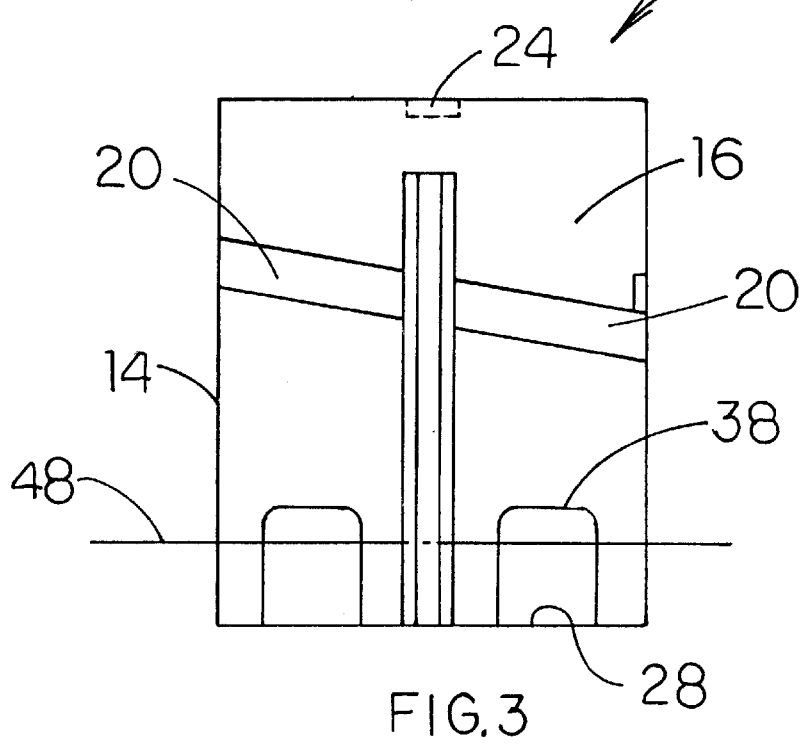
FIG. 3 is an end view of the new and improved electrical outlet box of the invention shown in FIGS. 1 and 2.

New and improved electrical outlet box 10 of the invention has a bottom 12, upstanding side walls 14 and opposite ends walls 16. Bottom 12 and walls 14, 16 form a nonmetallic enclosure 18 which meets all of the current requirements of UL 514C and NEC 370. Box 10 is made of conventional tough polymeric material and may be of whatever shape and size is desired such as the conventional cylindrical, rectangular and square boxes now on the market. In specific embodiments, single gang, two gang and three gang boxes are all contemplated. In addition, fixture boxes are contemplated. In the specific embodiment illustrated in FIGS. 1, 2 and 3, a rectangular box 10 is depicted. In other specific embodiments, square and round, and other shaped boxes are contemplated.

As shown in the figures, nail flanges 20 may be attached to the opposite ends of the box to provide means for attaching the box to a stud. Screw holes 22 may be provided in the bottom 12 of a box for the same purpose. Device mounts 24 including screw holes 26 are attached to each end wall 16 for the attachment of a device as required. Both ends walls 16 have cable openings 30 therein. Cable openings 30 are shown to be four in number, two each on opposite sides of the device mounts 24 in each end wall 16 in the embodiment shown in the drawings. However, cable openings 30 can alternatively be positioned in side walls 14 and can be provided in any number as desired and allowed in 1999 Standard UL. For example, a round box may have cable openings in the upstanding side wall at any radial position around the box as desired.

Figure 1:
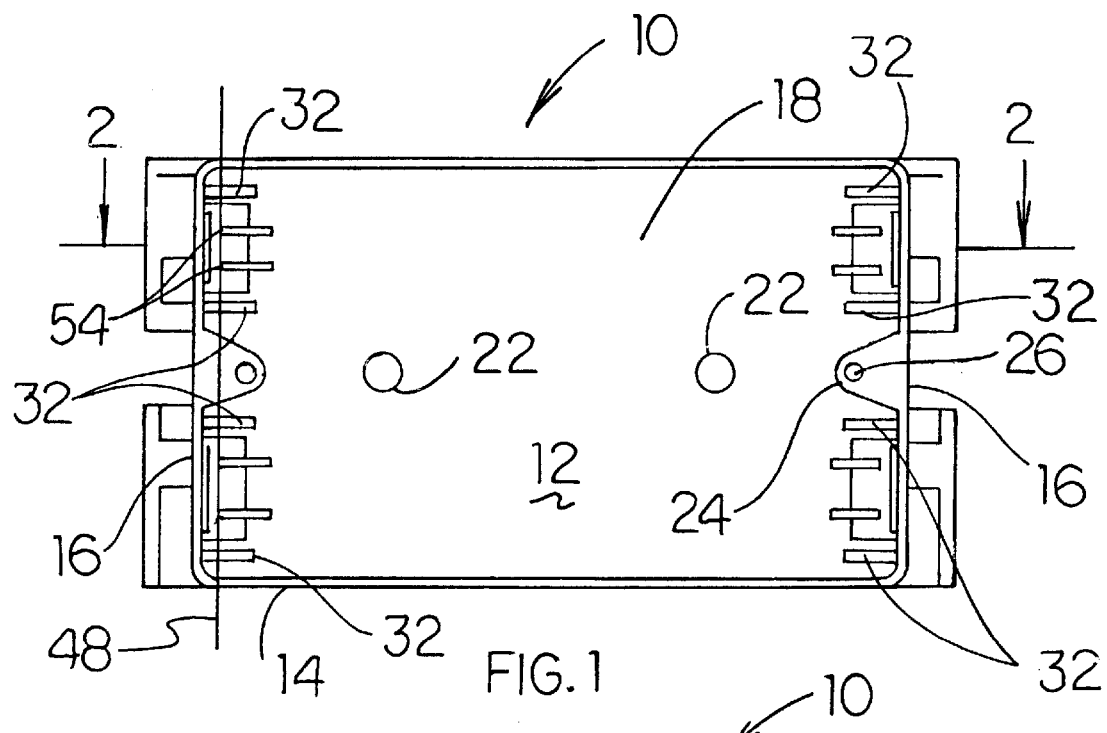
FIG. 1 is a top plan view of a specific embodiment of the new and improved electrical outlet box of the invention.

Cable openings 30 are bounded by a pair of spaced apart opposite walls 32. These walls 32 extend the entire vertical dimension of the opening 30. Walls 32 extend inwardly of the box 10. As shown in FIG. 1, walls 32 are spaced from side walls 14. In other embodiments, one of the walls 32 could be a side wall 14. Positioned between walls 32 is a door 36 closing the cable opening 30. In a specific embodiment, door 36 may be initially connected to side walls 16 and top 34 as well as bottom 12 to form a knockout in accordance with Standard UL 514C-26 existing on Sep. 30, 1998. Door 36 extends upwardly from bottom 12 to the top 34 of the cable opening 30 and the top 38 of door 36 generally parallel to walls 14 or 16 as the case may be. While angles between the door 36 and walls 14, 16 may be tolerated, angles as shown in FIG. 2 are always less than 135° to allow the knockout to be more easily opened and to lose less volume from within the box.

Cable opening 30 is bounded at its lower extremity by bottom 12 on opposite sides by door guides 32 and by top 34 which is an edge of wall 14 or 16. Positioned within cable opening 30 is a door 36 which is hingedly secured to bottom 12. Door 36 extends between bottom 12 and top 34 of cable opening 30 and between opposite door guides 32. Door 36 has a thickness of the material from which box 10 is made which allows it to both rotate about its connection point 28 with bottom 12 and to flex as suggested by the dashed lines in FIG. 4 about axes 48 which are generally parallel to bottom 12.

Door 36 has at least one rib 40 secured to bottom 12 and door 36 within enclosure 18. Ribs 40 extend inwardly of the box 10 from door 36 and upwardly from the floor 12. Ribs 40 extend approximately half the length of the door 36 and provide the lower half of door 36 with significantly more rigidity than the upper portion of door 36. Ribs 40 also restrain pivotal movement of door 36 about its connection 28 with floor 12. Both door 36 at its distal end or top 38 and top,34 of opening 30 have relatively sharp edges 42, 43 between which a cable positioned in door 30 will be clamped as will be explained more fully hereinafter. In the embodiment illustrated in FIGS. 1–3, door 36 is provided with two spaced apart ribs 40. More ribs 40 may be provided as desired. Ribs 40 extend inwardly a distance greater than side walls 32.

Figure 2:
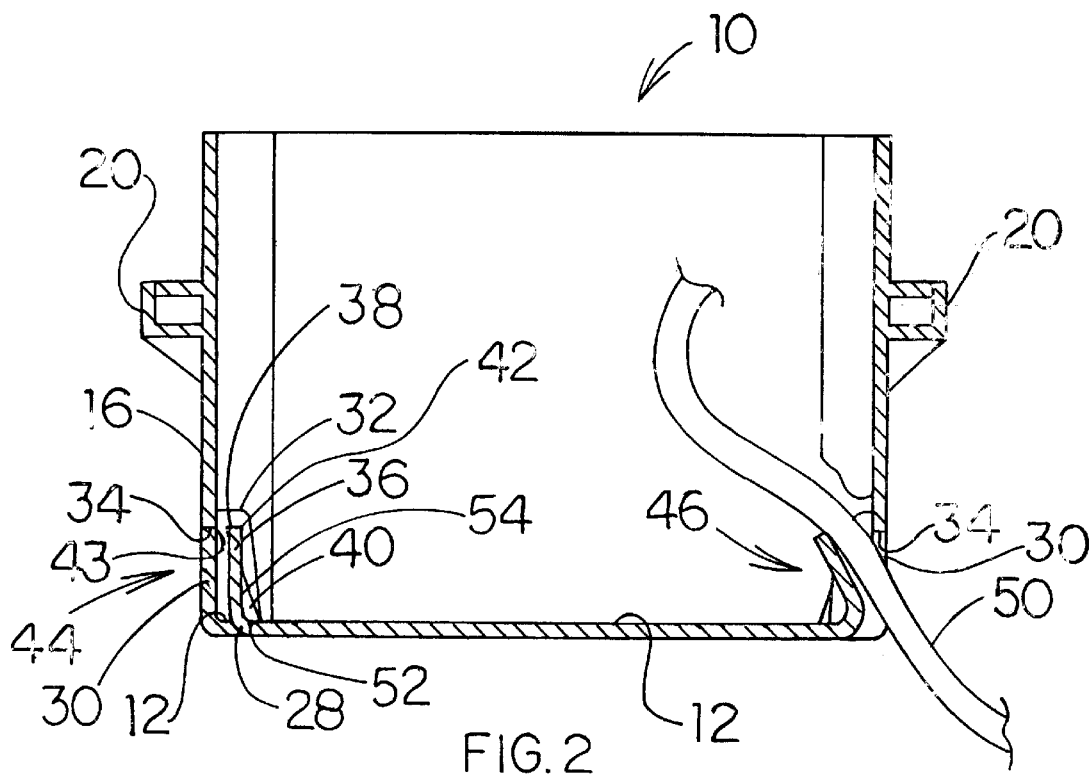
FIG. 2 is a cross-sectional view of the new and improved electrical outlet box of the invention as shown in FIG. 1, taken substantially along the Section Line 2—2 of FIG. 1 showing a cable positioned in one of the cable openings therein.
Figure 4:
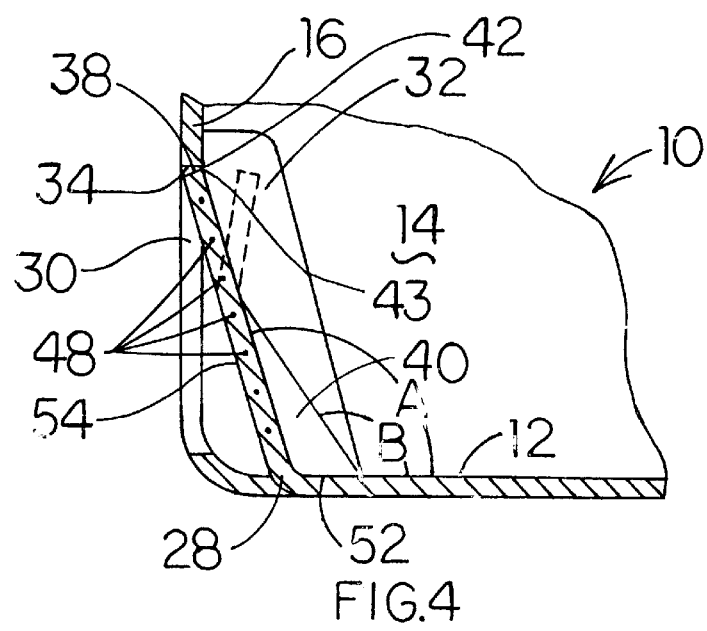
FIG. 4 is a fragmentary enlarged view of the lower left hand corner of the outlet box illustrated in FIG. 2.

Each door 36 is pivotally connected to bottom 12 for rotary motion about its connection 28 from a closed position shown 44 in solid lines in FIG. 2 to an open position 46 shown in dash lines in FIG. 4 in which door 36 is positioned within enclosure 18. Door 36 has a distal end 38 which has peripheral edges 42 thereon which cooperate with edges 43 on top 34 of opening 30 to clamp any cable that is positioned within opening 30 as will be explained hereinafter. Door 36 is also resiliently bendable above ribs 40 about axes 48 shown in FIGS. 1 and 3 as shown by the dash lines in FIG. 4 to allow a cable 50 to be positioned between top 34 of opening 30 and distal end 38 of door 36. Door 36 extends fully between spaced apart door guides 32 such that no cable 50 can be positioned between door guides 32 and door 36. Ribs 40 limit the movement between bottom 12 and door 36 and allow the door 36 to bend about axes 48 parallel to bottom 12 when urged open. As will be explained hereinafter, the insertion of a cable in any opening 30 will resiliently urge the door 36 into its open position whereupon door 36 will resiliently wedge the cable between its distal door end 38 and the top 34 of cable opening 30 in accordance with 1981 Standard UL 514C-25 and 1999 Standard UL 514C-27. So wedged, the new and improved electrical outlet box of the invention, the cable opening, and the door will pass the pull tests of the Standard UL 514C-27.1 and 27.3 existing on Sep. 30, 1998. Opposite door guides 32 serve to limit the bending of the door to axes 48 generally parallel to bottom 12. generally parallel to bottom 12.

As shown in FIG. 2, ribs 40 are triangular in shape having its base 52 secured to bottom 12 and its upstanding side 54 secured to door 36. Thus, in cross-sections taken parallel to bottom 12, ribs 40 are thicker adjacent bottom 12 than remote from bottom 12. This shape of ribs 40 limit the rotating movement of the doors 36 about axes 48 parallel to bottom 12 progressively with regard to the spacing of the axes of rotation 48 from bottom 12. Thus both the rotatable movement of door 36 about its pivotal connection 28 to bottom 12 and its bending movement about axes 48 parallel to bottom 12 are progressively less limited remote from bottom 12. The combination of the door 36, the door guides 32 and the opening 30 allow for cable 50 to be inserted within the opening 30 at a position remote from bottom 12. Both the door 36 and the opening 30 are generally provided in the shape of a parallelogram and the doors have a shape geometrically similar and of the same size to the shape of the cable opening 30.

Doors 36 generally upstand from bottom 12. In the specific embodiment illustrated, door 36 defines with bottom 12 an angle of about 103°. In specific embodiments, door 36 defines an angle A from about 115° to about 90° with bottom 12. In all specific embodiments, angle A is greater than 45° and less than 135°.

In a specific embodiment, the new and improved box 10 is integrally molded of thermoplastic flexible materials such as approved by UL. All of these materials have a relative thermal index of at least 80° C. as established by UL and flame resistance as established by testing in accordance with UL 94. In a specific embodiment, the thermal plastic material from which box 10 is integrally molded may be M3700 polyvinyl chloride as supplied by Geon Company of Avon Lake, Ohio or PPC-13 polyvinyl chloride material as supplied by Progressive Polymer Company of New Bedford, Mass. Other thermoplastic materials also can be utilized for the new and improved electrical box 10 of the invention provided they have the requisite relative thermal index and flame resistant properties and are approved by UL or other recognized testing laboratories. Except for the material cost, the new and improved electrical box 10 could also be made of acrylonitrile-butadiene-styrene (ABS) thermoplastic material.

The new and improved box 10 of the invention when manufactured of these UL approved polyvinyl chloride materials have the following dimensions:

| | | |
|---|---|---|
| Wall 14, 16 | thickness | 0.070 inches minimum |
| Bottom 12 | thickness | 0.070 inches minimum |
| Door 36 | thickness | 0.070 inches minimum |
| Angle A | between door 36 and bottom 12 | 103° ± 10° |
| Door 36 | thickness | 0.10 inches maximum |
| Rib 40 | length | 0.3 inches |
| Wall 32 | length | 0.72 inches |
| Angle B | between rib 40 and bottom 12 | 120° ± 10° |
| Knockout 30 | | 0.50 inches × 0.583 inches |
| Door 36 | | 0.50 inches × 0.583 inches |
| Walls 32 | thickness | 0.070 inches |
| Rib 40 | thickness | 0.045 inches |

In operation, the new and improved electrical outlet box 10 of the invention functions as all such electrical boxes to enclose electrical components and their connection to line voltage in accordance with the National Electrical Code. The electrical outlet box 10 may be fastened to studs by a bracket mounted to the studs, or the screw holes 22 or by the nail flanges 20, as is conventional. Electrical components and a cover plate as required by the code are attached to the box by the device mounts 24 and the screw holes 26 therein.

Under the National Electrical Code section 370-17(C), all nonmetallic boxes larger than 2¼ by 4 inches requires that the cable be secured to the box. This can be done in a number of ways but usually is achieved by sheathed cable clamps in cable openings in nonmetallic boxes. Recently, in 1999, the requirements under UL 514(C) are proposed to be amended to provide in paragraphs 27.4.1 and 27.4.2 to be capable of assembly at low temperatures (minus 4°±2° F. UL 514(C) paragraph 27.4 and withstand a pull test as prescribed in UL 514(C) paragraph 27 line 1 effective Feb. 1, 2000. The structure of the cable opening 30, the door 36 and the opposite walls 32 above-described comply with both 1999 UL 514(C) 26 as knockouts and 1999 UL 514(C)27 as an integral cable clamp for nonmetallic electrical outlet boxes. See UL 514(c) existing on Sep. 30, 1998.

In accordance with those standards, a sheathed cable 50 may be inserted through the cable opening 30. By means of a screw driver, used as a chisel, the door 36 may be moved relative to the cable opening 30 shown closed in FIG. 4 to open the cable opening 30 as shown in FIG. 2 at 44. Subsequent to the opening of the cable opening 30, a sheathed cable 50 such as shown in FIG. 2 at 46, may be inserted through the cable opening 30 from the outside of the box between the door 36 and the top 34 of the opening 30. Cable 50 is prevented from being positioned between the door 36 and the opposite end walls 32 by the door 36 and the end walls 32. The cable 50 moves the door 36 both pivotally about its connection 28 to bottom 12 and resiliently about axes 48 parallel to bottom 12. The cable 50 is clamped between the distal end 38 of door 36 and the top 34 of the cable opening 30. The door 36 resiliently wedges the cable between edges 43 of top 34 of opening 30 and edges 42 of distal end 38 of door 36. The door 36 is restrained from movement about its connection 28 to the floor 12 by the ribs 40 which are secured to both the bottom 12 and the lower portion of the door 36. The ribs 40 are progressively thicker adjacent the bottom 12 so as to allow the door 36 to pivot about its connection 28 to the bottom 12 and about axes 48 parallel to the bottom 12 by resiliently flexing door 36 progressively less as the axes 48 approach the bottom 12.

The installation of electrical boxes such as disclosed herein can be mounted to the studs from the inside of the home before the drywall is attached to the studs or can be mounted to the studs after the drywall is already in place from the outside of the wall (especially in the case of a manufactured home). In both cases, the knockouts can be opened using a screw driver as a chisel positioned essentially vertical to the box wall either from the upper side or the lower side of the electrical box of the invention. The doors 36 being substantially parallel to the box walls 14 or 16 as the case may be, facilitate the knockout opening. The angle A between the walls 14, 16 and the door 36 in all cases is kept small and in no embodiment of the invention does the angle between the bottom 12 and the door 36 approach 135° as knockouts at 135° may be difficult to open.

The assembly of the cable 50 within the knockout and cable opening 30 of the new and improved box 10 of the invention can be accomplished at all temperatures between room temperature and minus 4° F. without damage to the new and improved electrical box 10.

The installation of electrical devices in the electrical box 10 of the invention occurs after the wall is finished. The electrician will reach into the box 10, grab the sheathed cable and pull on the cable to straighten the cable. The cable covering is then stripped at the cable ends and the device installed. All of this rough handling and force on the cable applies forces to the cable clamps and the box walls. If the cable clamp door hinges from the side walls as in some prior art boxes, the cable clamp door bears most of these forces and the clamp door will swing out in response to the forces applied and some times breaks off from the box. In the new and improved electrical box 10 of the invention, the cable clamps hinge from the back or bottom 12 of the box and all of the force exerted by pulling on the cable within the box is applied to the side walls 14, 16 of the box rather than the door 36 of the cable clamp, thus eliminating clamp breakage.

The new and improved electrical outlet box 10 of the invention retains sheathed electrical cable in securance to the box in accordance with section 370–17C of the National Electrical Code without the use of screws, clamps or wedges. The electrical cables can be secured to the box totally from the exterior of the box and without manipulation within the box. The new and improved electrical outlet box does not have any separate parts which must be shipped with the box and all of the operable features of the box are accomplished by the box structure itself. The new and improved electrical outlet box of the invention presents little risk of damage to the electrical cable and will function in accordance with all of the requirements of 1999 UL 514(C) including paragraphs 27.4.1 and 27.4.2 proposed to go into effect Feb. 1, 2000.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto:

What is claimed is:

1. An electrical box for use with one or more electrical cables, said electrical box comprising an enclosure having a peripheral wall and a bottom, said peripheral wall having at least one cable opening therein, said cable opening being closed by a door, said door having pivotal connection to said bottom for rotary motion from a closed position about an axis generally parallel to said bottom to an open position in which said door is positioned within said enclosure, said door having a peripheral edge remote from said pivotal connection to said bottom which clamps a cable positioned in said opening between said door and said wall, said door being biased toward said wall, said door having door guides associated therewith to ensure movement of said door about axes generally parallel to said bottom and to prevent said cable from being lodged between said door and said door guides out of engagement with said edge.

2. The electrical box of claim 1 wherein said door is reinforced adjacent to said bottom to limit the pivotal movement between said door and said bottom and to allow the door to resiliently bend about axes parallel to and remote from said bottom.

3. The electrical box of claim 2 wherein said door has a thickness allowing said door to be bend about axes parallel to said bottom.

4. The electrical box of claim 2 wherein said door guides limit said bending axes to axes generally parallel to said bottom.

5. The electrical box of claim 1 wherein said door resiliently wedges said cable against said wall in accordance with Standard UL 514C-25 existing on Sep. 30, 1998.

6. The electrical box of claim 1 wherein said door and wall clamp said cable in accordance with Standard UL 514C-27 as existing on Sep. 30, 1998.

7. The electrical box of claim 1 wherein said box and said door wedge said cable against said wall in accordance with proposed Standard UL 514C-27.4 effective Feb. 1, 2000.

8. The electrical box of claim 1 wherein said door is a knockout in accordance with Standard UL 514C-26as existing on Sep. 30, 1998.

9. The electrical box of claim 1 wherein said box and door wedge said cable against said wall, said box, door and wall passing the pull tests of Standard UL 514C-27.1 and 27.3 as existing on Sep. 30, 1998.

10. The electrical box of claim 1 wherein said enclosure defines a parallelogram in cross-sections taken parallel to said bottom.

11. The electrical box of claim 1 wherein said door is reinforced to limit the bending of said doors adjacent to said bottom.

12. The electrical box of claim 1 wherein said door is limited in bending movement about axes parallel to said bottom and progressively remote from said bottom.

13. The electrical box of claim 1 wherein said door guides prevent cables from being positioned said guards and said door.

14. The electrical box of claim 1 wherein said door guides guide said cable between said door remote from said bottom and said wall.

15. The electrical box of claim 1 wherein said door guides position said cable between said door and said wall opposite the connection of said door to said bottom.

16. The electrical box of claim 1 wherein said opening is generally the shape of a parallelogram and said door has a shape geometrically similar to the shape of said openings.

17. The electrical box of claim 1 wherein said door is connected to said bottom adjacent to the joinder of said bottom and said wall.

18. The electrical box of claim 1 wherein said door guides extend from said wall and said bottom generally perpendicular thereto and on opposite sides of said openings.

19. The electrical box of claim 1 wherein said door is upstanding from said bottom.

20. The electrical box of claim 1 wherein said door defines an angle with said bottom which is greater than about 90°.

21. The electrical box of claim 1 wherein said door defines an angle with said wall which measures from about 135° to about 90°.

22. The electrical box of claim 1 wherein said door guides extend from said bottom and said wall on opposite sides of said opening, said door guides extend beyond the connection of said door to said bottom.

23. The electrical box of claim 1 wherein said door is moveable from a closed condition to an open condition, said door being biased toward said closed condition.

24. The electrical box of claim 1 wherein said door is reinforced by ribs on said door within said box.

25. The electrical box of claim 24 wherein said ribs are progressively thicker in dimensions perpendicular to said door adjacent said bottom.

26. The electrical box of claim 25 wherein said ribs are connected to said door and said bottom.

27. The electrical box of claim 25 wherein said ribs are generally right triangular in shape having the base thereof secured to said bottom and having the upstanding generally perpendicular edge thereof secured to said door.

28. The electrical box of claim 25 wherein said ribs extend from said bottom approximately half way of said door.

29. The electrical box of claim 25 wherein said ribs have a width at said bottom wider than said door.

30. The electrical box of claim 25 wherein said door above said ribs is bendable about axes generally parallel to said bottom.

31. The electrical box of claim 24 wherein there are a plurality of ribs.

* * * * *

UNITED STATES PATENT AND TRADEMARK OFFICE
CERTIFICATE OF CORRECTION

PATENT NO.     : 6,365,831 B1
DATED          : April 2, 2002
INVENTOR(S)    : Eng et al.

It is certified that error appears in the above-identified patent and that said Letters Patent is hereby corrected as shown below:

Column 8,
Line 57, Claim 1, should read:

1. An integrated circuit package comprising:
   a multilayered substrate having a central opening extending therethrough to a pair of spaced apart opposing surfaces and a region exterior to said central opening;
   a plurality of routing strips disposed within said substrate, extending between said central opening and said region exterior to said central opening and having an exposed surface disposed within said opening;
   a plurality of pads disposed on one of said surfaces, at least one of said pads being electrically connected to one of said plurality of routing strips;
   [wire bonding electrically connecting said at least one of said bonding pads to at least one of said routing strips;]

an adhesive material disposed on the other of said surfaces of said substrate;
   a chip having a pair of opposing major surfaces and a perimeter, said chip being adhered to said substrate by said adhesive material, said chip having at least one bonding pad disposed in said opening, said adhesive material surrounding the perimeter of said chip to provide an hermetic seal between said chip and said substrate to protect said chip;

wire bonding electrically connecting said at least one of said bonding pads to at least one of said routing strips; and
   potting material filling said central opening.

Line 19, Claim 6, should be:
   6. An integrated circuit package comprising:
   a substrate having an opening extending therethrough to a pair of opposing surfaces;
   a plurality of routing strips integral with said substrate and extending into said opening;
   a plurality of pads disposed on one of said surfaces, at least one of said pads being electrically connected with at least one of said routing strips;
   [wire bonding electrically connecting said at least one of said bonding pads to at least one of said routing strips;]
   an adhesive material disposed on one of said surfaces of said substrate;

UNITED STATES PATENT AND TRADEMARK OFFICE
CERTIFICATE OF CORRECTION

PATENT NO. : 6,365,831 B1
DATED : April 2, 2002
INVENTOR(S) : Eng et al.

It is certified that error appears in the above-identified patent and that said Letters Patent is hereby corrected as shown below:

Column 8 cont'd.,
  a chip having a pair of opposing major surfaces and a perimeter, said chip being adhered to said substrate by said adhesive material, said chip having at least one bonding pad, said adhesive material surrounding the perimeter of said chip to provide an hermetic seal with said chip to protect said chip;
  wire bonding electrically connecting said at least one of said bonding pads to at least one of said routing strips; and
  potting material filling said opening;
  further including at least one bus bar integral with said substrate and extending into said opening, said at least one bus bar electrically connected to at least one of said bonding pads and at least one of said pads disposed on said surfaces of said substrate.

Signed and Sealed this

Twenty-ninth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,365,831 B1
DATED         : April 2, 2002
INVENTOR(S)   : Bradford D. Rupp et al.

It is certified that error appears in the above-identified patent and that said Letters Patent is hereby corrected as shown below:

This certificate supersedes Certificate of Correction issued June 29, 2004, the number was erroneously mentioned and should be vacated since no Certificate of Correction was granted.

Signed and Sealed this

Tenth Day of August, 2004

JON W. DUDAS
*Acting Director of the United States Patent and Trademark Office*